(12) United States Patent
Suetsugu et al.

(10) Patent No.: US 10,033,038 B2
(45) Date of Patent: Jul. 24, 2018

(54) ELECTROLYTIC MANGANESE DIOXIDE, METHOD FOR PRODUCING SAME, AND USE OF SAME

(71) Applicant: TOSOH CORPORATION, Shunan-shi, Yamaguchi (JP)

(72) Inventors: Kazumasa Suetsugu, Shunan (JP); Kazuo Sekitani, Shunan (JP)

(73) Assignee: TOSOH CORPORATION, Shunan-shi, Yamaguchi (JP)

( * ) Notice: Subject to any disclaimer, the term of this patent is extended or adjusted under 35 U.S.C. 154(b) by 80 days.

(21) Appl. No.: 14/380,022

(22) PCT Filed: Feb. 20, 2013

(86) PCT No.: PCT/JP2013/054215
§ 371 (c)(1),
(2) Date: Aug. 20, 2014

(87) PCT Pub. No.: WO2013/125594
PCT Pub. Date: Aug. 29, 2013

(65) Prior Publication Data
US 2015/0030926 A1    Jan. 29, 2015

(30) Foreign Application Priority Data
Feb. 21, 2012    (JP) .................... 2012-034980

(51) Int. Cl.
*H01M 4/50*    (2010.01)
*C25B 1/21*    (2006.01)
*H01M 6/06*    (2006.01)

(52) U.S. Cl.
CPC ................ *H01M 4/50* (2013.01); *C25B 1/21* (2013.01); *H01M 6/06* (2013.01); *H01M 2220/30* (2013.01)

(58) Field of Classification Search
CPC ...................................................... H01M 4/50
See application file for complete search history.

(56) References Cited

U.S. PATENT DOCUMENTS 5,277,890 A  *  1/1994  Wang ..................... C01G 45/02
                                                              423/50
2003/0170170 A1    9/2003  Davis et al.
(Continued)

FOREIGN PATENT DOCUMENTS

EP    0751241 A1    1/1997
JP    63-021224    *    1/1988    ............. C01G 45/02
(Continued)

OTHER PUBLICATIONS

E. Preisler, "Problems Involved in the Technical Preparation of Top Quality Electrolytic Manganese Dioxide", 6087 Progress in Batteries and Solar Cells, vol. 10, 1991, pp. 1-22, XP000329769.
(Continued)

*Primary Examiner* — Jeremiah R Smith
(74) *Attorney, Agent, or Firm* — Sughrue Mion, PLLC

(57) ABSTRACT

The object of the present invention is to provide electrolytic manganese dioxide excellent in the middle rate discharge characteristic as compared with conventional electrolytic manganese dioxide, and a method for its production and its application.
Electrolytic manganese dioxide characterized in that the potential as measured in a 40 wt % KOH aqueous solution by using a mercury/mercury oxide reference electrode as a standard is higher than 250 mV and less than 310 mV, and the volume of pores having a pore diameter of at least 2 nm and at most 50 nm is at most 0.0055 cm³/g. Of such electrolytic manganese dioxide, the volume of pores having a pore diameter of at least 2 nm and at most 200 nm is preferably at most 0.0555 cm³/g.

8 Claims, 1 Drawing Sheet

(a)

(b)

(56) References Cited

U.S. PATENT DOCUMENTS

| | | | |
|---|---|---|---|
| 2008/0193847 A1* | 8/2008 | Suetsugu | C25B 1/21 429/224 |
| 2009/0197169 A1 | 8/2009 | Nunome et al. | |
| 2011/0219607 A1* | 9/2011 | Nanjundaswamy | C01G 45/02 29/623.1 |
| 2011/0220842 A1 | 9/2011 | Nanjundaswamy et al. | |
| 2012/0141361 A1* | 6/2012 | Suetsugu | C01G 45/02 423/605 |

FOREIGN PATENT DOCUMENTS

| | | |
|---|---|---|
| JP | 07-166386 A | 6/1995 |
| JP | 2005-520290 A | 7/2005 |
| JP | 2007-123149 A | 5/2007 |
| JP | 2007-141643 A | 6/2007 |
| JP | 2009-289728 A | 12/2009 |
| JP | 2011-068552 A | 4/2011 |
| WO | 2011/024765 A1 | 3/2011 |

OTHER PUBLICATIONS

WPI / Derwent, "Electrolytic Manganese di:oxide prodn.—by electrolysing manganese oxide suspended in electrolyte", Feb. 3, 1988, (1 page total) XP002014250.

Communication dated Oct. 9, 2015 from the European Patent Office in counterpart European Application No. 13752318.9.

English Translation of International Report on Patentability issued in application on PCT/JP2013/054215 dated Sep. 4, 2014.

International Search Report of PCT/JP2013/054215 dated Apr. 2, 2013.

Communication dated Apr. 7, 2017, issued by the European Patent Office in corresponding European Application No. 13 752 318.9.

* cited by examiner

ELECTROLYTIC MANGANESE DIOXIDE, METHOD FOR PRODUCING SAME, AND USE OF SAME

CROSS REFERENCE TO RELATED APPLICATIONS

This is a National Stage of International Application No. PCT/JP2013/054215 filed Feb. 20, 2013, claiming priority based on Japanese Patent Application No. 2012-034980 filed Feb. 21, 2012, the contents of all of which are incorporated herein by reference in their entirety.

TECHNICAL FIELD

The present invention relates to electrolytic manganese dioxide to be used as a cathode active material for primary cells such as manganese dry cells and alkali-manganese dry cells, and a method for its production and its application.

BACKGROUND ART

Electrolytic manganese dioxide has been used as a cathode active material for primary cells particularly alkali-manganese dry cells. Heretofore, dry cells suitable for an application for which a high discharge current (high rate discharge) is required, so-called dry cells excellent in the high rate discharge characteristic have been desired. Accordingly, as electrolytic manganese dioxide to be used as a cathode active material for alkali-manganese dry cells, electrolytic manganese dioxide excellent in the high rate discharge characteristic has been studied (for example, Patent Document 1).

However, along with electric power saving of a portable electronic device in recent years, dry cells which require a discharge current lower than the high rate discharge, so-called dry cells excellent in the middle rate discharge characteristic have been required. Thus, electrolytic manganese dioxide excellent in the middle rate discharge characteristic has been required.

As electrolytic manganese dioxide excellent in the middle rate discharge characteristic, the present inventors have reported electrolytic manganese dioxide having controlled potential and crystallinity (for example, Patent Document 2).

PRIOR ART DOCUMENTS

Patent Documents

Patent Document 1: JP-A-2007-141643
Patent Document 2: JP-A-2011-68552

DISCLOSURE OF INVENTION

Technical Problem

The present inventors have reported electrolytic manganese dioxide excellent in the middle rate discharge characteristic. However, along with an increase in the functionality of an electronic device such as a portable electronic device, electrolytic manganese dioxide capable of middle rate discharge for a longer time has been required.

It is an object of the present invention to provide electrolytic manganese dioxide excellent in the middle rate discharge characteristic as compared with conventional electrolytic manganese dioxide, and a method for its production and its application.

Solution to Problem

The present inventors have conducted extensive studies on manganese dioxide to be used as a cathode active material particularly for alkali-manganese dry cells. As a result, they have found that different types of electrolytic manganese dioxide differing in the pores have different middle rate discharge characteristic even though they have the same potential, and electrolytic manganese dioxide having pores having a specific size controlled is excellent in the middle rate discharge characteristic as compared with conventional electrolytic manganese dioxide, and accomplished the present invention.

That is, the present invention provides the following.

(1) Electrolytic manganese dioxide characterized in that the potential as measured in a 40 wt % KOH aqueous solution by using a mercury/mercury oxide reference electrode as a standard is higher than 250 mV and less than 310 mV, and the volume of pores having a pore diameter of at least 2 nm and at most 50 nm is at most 0.0055 cm$^3$/g.

(2) The electrolytic manganese dioxide according to the above (1), wherein the volume of pores having a pore diameter of at least 2 nm and at most 200 nm is at most 0.0555 cm$^3$/g.

(3) The electrolytic manganese dioxide according to the above (1) or (2), wherein the BET specific surface area is at least 12 m$^2$/g and less than 36 m$^2$/g.

(4) The electrolytic manganese dioxide according to any one of the above (1) to (3), wherein the bulk density is at least 1.5 g/cm$^3$.

(5) The electrolytic manganese dioxide according to any one of the above (1) to (4), wherein the apparent particle density is at least 3.4 g/cm$^3$.

(6) The electrolytic manganese dioxide according to any one of the above (1) to (5), wherein the full width at half maximum of the diffraction line of the (110) plane in the vicinity of $2\theta=22\pm1°$ in a XRD measurement pattern using CuK$\alpha$ radiation as the light source is at least 1.6° and at most 2.6°.

(7) A method for producing the electrolytic manganese dioxide as defined in any one of the above (1) to (6), by suspending manganese oxide in a solution of sulfuric acid/manganese sulfate mixture, characterized in that manganese oxide particles are continuously mixed with the solution of sulfuric acid/manganese sulfate mixture, and electrolysis is carried out at a concentration of the manganese oxide particles in the solution of sulfuric acid/manganese sulfate mixture of at least 2.5 mg/L and at most 50 mg/L, at a sulfuric acid concentration in the solution of sulfuric acid/manganese sulfate mixture of at least 25 g/L and at most 55 g/L, at an electrolysis current density of at least 0.5 A/dm$^2$ and at most 1.0 A/dm$^2$.

(8) The method for producing the electrolytic manganese dioxide according to the above (7), wherein the electrolysis current density is at least 0.55 A/dm$^2$ and at most 0.88 A/dm$^2$.

(9) The method for producing the electrolytic manganese dioxide according to the above (7) or (8), wherein the concentration of the manganese oxide particles is higher than 3 mg/L and at most 30 mg/L.

(10) The method for producing the electrolytic manganese dioxide according to any one of the above (7) to (9), wherein the sulfuric acid concentration at the termination of the electrolysis is higher than the sulfuric acid concentration at the initiation of the electrolysis.

(11) A cathode active material containing the electrolytic manganese dioxide as defined in any one of the above (1) to (6).

Advantageous Effects of Invention

According to the electrolytic manganese dioxide of the present invention, a cathode active material for primary cells excellent in the middle rate discharge characteristic can be provided. Particularly when the electrolytic manganese dioxide of the present invention is used as a cathode active material for alkali-manganese cells, excellent packing efficiency is achieved, and middle rate discharge can be carried out for a longer period of time.

DESCRIPTION OF EMBODIMENTS

Now, the electrolytic manganese dioxide of the present invention will be described.

The volume of pores having a pore diameter of at least 2 nm and at most 50 nm (hereinafter referred to as "mesopores") of the electrolytic manganese dioxide of the present invention is at most 0.0055 cm$^3$/g. By the volume of the mesopores being within the above range, the electrolytic manganese dioxide of the present invention is electrolytic manganese dioxide excellent in the middle rate discharge characteristic. Further, the smaller the volume of the mesopores is, the higher the middle rate discharge characteristic of the electrolytic manganese dioxide tends to be. Accordingly, the volume of the mesopores of the electrolytic manganese dioxide of the present invention is preferably less than 0.004 cm$^3$/g, more preferably at most 0.0035 cm$^3$/g, further preferably at most 0.0028 cm$^3$/g, still more preferably at most 0.0025 cm$^3$/g, particularly preferably at most 0.002 cm$^3$/g.

As one reason, the following is considered. That is, in an alkali-manganese dry cell, a discharge reaction occurs at the interface between electrolytic manganese dioxide and an electrolyte. However, since the mesopores have a small pore size, the electrolyte hardly infiltrates into their interior. Accordingly, in the interior of the mesopores, the interface between the electrolytic manganese dioxide and the electrolyte hardly forms, and the discharge reaction hardly occurs in the interior of the mesopores. The electrolytic manganese dioxide which contributes to the discharge reaction increases by reducing the mesopores. Therefore, it is considered that the electrolytic manganese dioxide of the present invention is capable of middle rate discharge for a longer period of time.

The smaller the volume of the mesopores is, the higher the middle rate discharge characteristic of the obtained electrolytic manganese dioxide tends to be. Accordingly, the electrolytic manganese dioxide of the present invention preferably contains substantially no mesopores. However, electrolytic manganese dioxide having completely no mesopores is hardly obtainable. Accordingly, considering the measurement errors, etc., the substantial volume of the mesopores may be at least 0.00 cm$^3$/g, at least 0.0001 cm$^3$/g, or further at least 0.0003 cm$^3$/g.

The alkali potential of the electrolytic manganese dioxide of the present invention is higher than 250 mV. If electrolytic manganese dioxide having an alkali potential of at most 250 mV is used as a cathode active material for alkali-manganese dry cells, the open circuit voltage of the cell tends to be low, and the discharge time over which the middle rate discharge can be carried out tends to be short.

The higher the alkali potential is, the longer the discharge time tends to be. Accordingly, the alkali potential is preferably at least 255 mV, more preferably at least 265 mV, further preferably at least 270 mV.

In order that the electrolytic manganese dioxide has a high middle rate discharge characteristic, the alkali potential is required to be high to a certain extent. However, if the alkali potential is higher than a certain level, the middle rate discharge characteristic tends to decrease again. Accordingly, of the electrolytic manganese dioxide of the present invention, the alkali potential is less than 310 mV, preferably at most 300 mV, more preferably at most 290 mV, further preferably a most 285 mV.

Pores having a pore diameter larger than 50 nm and at most 200 nm (hereinafter referred to as "submesopores") of the electrolytic manganese dioxide of the present invention are considered to contribute to the discharge reaction. Accordingly, the volume of the submesopores is at least 0.005 cm$^3$/g, preferably at least 0.01 cm$^3$/g, more preferably at least 0.015 cm$^3$/g, further preferably at least 0.02 cm$^3$/g, still more preferably at least 0.03 cm$^3$/g, whereby the discharge reaction tends to easily proceed.

However, if the submesopores are too many, the packing density tends to be low. Accordingly, the volume of the submesopores is at most 0.05 cm$^3$/g, further at most 0.04 cm$^3$/g.

Further, if both of the mesopores and the submesopores, that is, pores having a pore diameter of at least 2 nm and at most 200 nm (hereinafter referred to as "secondary pores") are too many, the packing efficiency of the electrolytic manganese dioxide tends to be low. Accordingly, the volume of the secondary pores of the electrolytic manganese dioxide of the present invention is preferably at most 0.0555 cm$^3$/g, more preferably at most 0.045 cm$^3$/g, further preferably at most 0.025 cm$^3$/g, still more preferably at most 0.02 cm$^3$/g, still further preferably at most 0.016 cm$^3$/g.

If the volume of pores having a pore diameter larger than 200 nm is large, the packing efficiency of the electrolytic manganese dioxide tends to be low. Accordingly, the volume of pores larger than 200 nm of the electrolytic manganese dioxide of the present invention is preferably at most 0.35 cm$^3$/g.

The bulk density of the electrolytic manganese dioxide of the present invention is preferably at least 1.5 g/cm$^3$, more preferably at least 1.7 g/cm$^3$, further preferably at least 1.8 g/cm$^3$, still more preferably at least 2.0 g/cm$^3$. When the bulk density is at least 1.5 g/cm$^3$, when such electrolytic manganese dioxide is mixed with an electrically conductive material and the like to prepare a cathode mixture, its packing efficiency tends to be high. On the other hand, the bulk density is not necessarily extremely high. Accordingly, the bulk density may be at most 3.0 g/cm$^3$, further at most 2.5 g/cm$^3$.

The apparent particle density of the electrolytic manganese dioxide of the present invention is preferably at least 3.4 g/cm$^3$, more preferably at least 3.5 g/cm$^3$, further preferably at least 3.7 g/cm$^3$, still more preferably at least 3.8 g/cm$^3$, particularly preferably at least 3.9 g/cm$^3$. When the apparent particle density of the electrolytic manganese dioxide is at least 3.4 g/cm$^3$, the amount of the electrolytic manganese dioxide which can be packed in a dry cell having a determined internal volume such as an alkali-manganese cell tends to be large.

Of the electrolytic manganese dioxide of the present invention, the full width at half maximum (hereinafter referred to simply as "FWHM") of the diffraction line of the (110) plane in the vicinity of 2θ=22±1° in a powder X-ray diffraction (hereinafter referred to as "XRD") pattern using CuKα radiation as the light source, is preferably at least 1.6° and at most 2.6°, more preferably at least 1.7° and at most 2.5°, further preferably at least 2.1° and at most 2.4°. When FWHM is within such a range, the packing efficiency of the electrolytic manganese dioxide tends to be high, and the middle rate discharge characteristic tends to be high. Here, the XRD measurement in the present invention may be usual powder X-ray diffraction measurement using CuKα radiation as the light source. Usual powder X-ray diffraction measurement may, for example, be a measurement method using CuKα radiation as the light source with a step scanning of at most 0.05° for a measuring time of at least 3 seconds, or a method employed in Examples.

Of the electrolytic manganese dioxide of the present invention, the BET specific surface area is preferably at least 12 m$^2$/g, more preferably at least 14 m$^2$/g, further preferably at least 16 m$^2$/g, still more preferably at least 22 m$^2$/g. When the BET specific surface area is at least 12 m$^2$/g, the area of contact between the electrolytic manganese dioxide and the electrolyte tends to increase, whereby the discharge capacity in the middle rate discharge of a dry cell using the electrolytic manganese dioxide of the present invention as a cathode active material tends to be large. On the other hand, when the BET specific surface area is less than 36 m$^2$/g, further at most 32 m$^2$/g, still further at most 30 m$^2$/g, the middle rate discharge characteristic will not be decreased, and the packing efficiency of the electrolytic manganese dioxide tends to be high.

The electrolytic manganese dioxide of the present invention is such that the intensity ratio of the peak of the (110) plane to the peak of the (021) plane (hereinafter referred to as "(110)/(021) peak intensity ratio") in the XRD pattern is preferably at least 0.6, more preferably at least 0.7, further preferably higher than 0.8. The (110)/(021) peak intensity ratio is at most 1.1, further at most 1.05, still further at most 1.0.

In the XRD measurement of the electrolytic manganese dioxide, the peak of the (110) plane appears in the vicinity of 2θ=22±1°, and the peak of the (021) plane appears in the vicinity of 2θ=37±1°. These peaks are both main XRD peaks of manganese dioxide crystal. The ratio of these peak intensities is considered to be an index of the crystallinity of the electrolytic manganese dioxide.

Now, the method for producing electrolytic manganese dioxide of the present invention will be described.

The electrolytic manganese dioxide of the present invention may be produced by a method for producing electrolytic manganese dioxide by suspending manganese dioxide in a solution of sulfuric acid/manganese sulfate mixture, characterized in that manganese oxide particles are continuously mixed with the solution of sulfuric acid/manganese sulfate mixture, and electrolysis is carried out at a concentration of the manganese oxide particles in the solution of sulfuric acid/manganese sulfate mixture of at least 2.5 mg/L and at most 50 mg/L at a sulfuric acid concentration in the solution of sulfuric acid/manganese sulfate mixture of at least 25 g/L and at most 55 g/L at an electrolysis current density of at least 0.5 A/dm$^2$ and at most 1.0 A/dm$^2$.

The production method of the present invention is a method for producing electrolytic manganese dioxide by suspending manganese oxide in an electrolyte, that is, a method for producing electrolytic manganese dioxide by electrolyzing an electrolyte containing manganese oxide, and is a so-called suspension electrolysis method. Therefore, the production method of the present invention is different from a method for producing electrolytic manganese dioxide of electrolyzing an electrolyte containing substantially no manganese oxide, a so-called clear electrolyte electrolysis method, such as a method of electrolyzing a solution of sulfuric acid/manganese sulfate mixture without using manganese oxide. By the suspension electrolysis method, it is possible to produce the electrolytic manganese dioxide of the present invention of which the pore structure, the crystal structure and the BET specific surface area are controlled. In addition, by the suspension electrolysis method, the electrolysis current efficiency will be improved as compared with a clarification electrolysis method without using manganese oxide.

In addition, by clear electrolyte electrolysis, manganese dioxide precipitated during the period of electrolysis may be peeled and fall down from the electrolysis electrode and be included in the electrolyte in some cases (hereinafter referred to as "falling and inclusion"). Falling and inclusion occurs irregularly and locally. If falling and inclusion occurs, electrolysis tends to be unstable, and physical properties of the obtained electrolytic manganese dioxide tend to be dispersed, for example, electrolytic manganese dioxide having many mesopores tends to be obtained.

In the production method of the present invention, as the electrolyte, a solution of sulfuric acid/manganese sulfate mixture is used. Differently from an electrolysis method using a manganese sulfate aqueous solution as an electrolyte, by an electrolysis method using a solution of sulfuric acid/manganese sulfate mixture as an electrolyte, it is possible to control the sulfuric acid concentration during the period of electrolysis. Accordingly, even when electrolysis is carried out for a long period of time, the sulfuric acid concentration can optionally be set, whereby electrolytic manganese dioxide can be produced stably and in addition, the state of pores of the obtained electrolytic manganese dioxide tends to be uniform. The solution of sulfuric acid/manganese sulfate mixture is more preferably an aqueous solution of sulfuric acid/manganese sulfate mixture.

In the production method of the present invention, manganese oxide particles are continuously mixed with the solution of sulfuric acid/manganese sulfate mixture, whereby the concentration of the manganese oxide particles in the solution of sulfuric acid/manganese sulfate mixture can be made stable during the period of electrolysis, and an electrolyte containing manganese oxide at a certain concentration over a period of electrolysis is electrolyzed. Thus, physical properties particularly the state of pores of the electrolytic manganese dioxide obtainable over the entire period of electrolysis tend to be uniform.

To continuously mix the manganese oxide particles with the solution of sulfuric acid/manganese sulfate mixture, a method of mixing the manganese oxide particles with the solution of sulfuric acid/manganese sulfate mixture, a method of mixing an oxidizing agent with an electrolyte to form the manganese oxide particles in the solution of sulfuric acid/manganese sulfate mixture, or both, may be employed.

In the production method of the present invention, "continuously mixing" means not only mixing the manganese oxide particles with the solution of sulfuric acid/manganese sulfate mixture at a certain proportion over the entire period of electrolysis but also intermittently mixing the manganese oxide particles with the solution of sulfuric acid/manganese sulfate mixture so that the concentration of the manganese oxide particles in the solution of sulfuric acid/manganese sulfate mixture is constant during the period of electrolysis (for example, the concentration of the manganese oxide particles in the solution of sulfuric acid/manganese sulfate mixture is the desired value±20%).

In a case where the manganese oxide particles are mixed with the solution of sulfuric acid/manganese sulfate mixture, as the manganese oxide particles to be mixed, use of at least one member selected from the group consisting of manganese dioxide ($MnO_2$), manganese sesquioxide ($Mn_2O_3$) and trimanganese tetraoxide ($Mn_3O_4$) may be exemplified, and preferably use of $MnO_2$ may be exemplified. Such manganese oxide particles may be preliminarily formed into a slurry and then mixed with the solution of sulfuric acid/manganese sulfate mixture, or the manganese oxide particles may be directly be mixed with the solution of sulfuric acid/manganese sulfate mixture.

In a case where an oxidizing agent is mixed with the solution of sulfuric acid/manganese sulfate mixture to form manganese oxide particles, the type of the oxidizing agent is not particularly limited so long as manganese ions in the solution of sulfuric acid/manganese sulfate mixture are precipitated as particles of manganese oxide. The oxidizing agent may, for example, be a persulfate, preferably sodium persulfate ($Na_2S_2O_8$). By mixing the oxidizing agent with the solution of sulfuric acid/manganese sulfate mixture, bivalent manganese ($Mn^{2+}$) in the solution of sulfuric acid/manganese sulfate mixture is oxidized and precipitates in the form of the manganese oxide particles.

The manganese oxide particles have an average particle size of preferably at most 5 μm, more preferably at most 3 μm, further preferably at most 1 μm, still more preferably at most 0.9 μm. When the average particle size is at most 5 μm, the manganese oxide particles are less likely to settle and are likely to be uniformly dispersed in the solution of sulfuric acid/manganese sulfate mixture. In such a manner, the manganese oxide particles preferably have an average particle size to such an extent that the dispersibility is not lowered, and the practical value may be at least 0.5 μm.

The concentration of the manganese oxide particles in the solution of sulfuric acid/manganese sulfate mixture is at least 2.5 mg/L and at most 50 mg/L. Within a range of the electrolysis current density in the production method of the present invention, if the concentration of the manganese oxide particles exceeds 50 mg/L, the obtained electrolytic manganese dioxide tends to be such that the volume of the submesopores effective for the discharge reaction is too small, or the alkali potential is lowered. With such electrolytic manganese dioxide, the time over which the middle rate discharge is possible tends to be short.

In order to obtain electrolytic manganese dioxide with which the middle rate discharge for a longer period of time is possible, the concentration of the manganese oxide particles is preferably at most 30 mg/L, more preferably at most 25 mg/L, further preferably at most 20 mg/L, still more preferably at most 15 mg/L, particularly preferably at most 10 mg/L.

On the other hand, if the concentration of the manganese oxide particles is less than 2.5 mg/L, the effect by mixing the manganese oxide particles with the solution of sulfuric acid/manganese sulfate mixture will not be obtained. In order to increase the effect by mixing the manganese oxide particles, the concentration of the manganese oxide particles is preferably higher than 3 mg/L, more preferably at least 5 mg/L, further preferably at least 6 mg/L.

Of the solution of sulfuric acid/manganese sulfate mixture used in the production method of the present invention, the sulfuric acid concentration is at least 25 g/L, preferably higher than 30 g/L, more preferably at least 32 g/L. When the sulfuric acid concentration of the solution of sulfuric acid/manganese sulfate mixture is within such a range, the alkali potential of the obtained electrolytic manganese dioxide is within a range of the alkali potential of the electrolytic manganese dioxide of the present invention. On the other hand, if the sulfuric acid concentration is too high, corrosion of the electrode substrate of the electrolytic cell will proceed, and the electrolytic manganese dioxide will hardly be obtained. Further, in such a state, a phenomenon such that the electrodeposited electrolytic manganese dioxide is peeled from the electrolysis electrode, so-called peeling tends to occur. Accordingly, even if electrolytic manganese dioxide is obtained in such a state, its alkali potential tends to be low. Therefore, the sulfuric acid concentration of the solution of sulfuric acid/manganese sulfate mixture is at most 55 g/L, preferably at most 50 g/L, more preferably at most 45 g/L.

Here, the sulfuric acid concentration is a value as sulfuric acid ($H_2SO_4$) excluding bivalent anions ($SO_4^{2-}$) contained in manganese sulfate in the solution of sulfuric acid/manganese sulfate mixture.

In the production method of the present invention, so long as the sulfuric acid concentration of the solution of sulfuric acid/manganese sulfate mixture is within the above range, the sulfuric acid concentration during the period of electrolysis is not necessarily constant. For example, the sulfuric acid concentration may optionally be changed during the period of electrolysis, and it is preferred that the sulfuric acid concentration at the termination of the electrolysis is higher than the sulfuric acid concentration at the initiation of the electrolysis. By the sulfuric acid concentration at the termination of the electrolysis being higher than the sulfuric acid concentration at the initiation of the electrolysis, corrosion of the electrode substrate of the electrolytic cell is suppressed and in addition, electrolytic manganese dioxide having a potential suitable for the middle rate discharge characteristic will be obtained.

As such an electrolysis method, it is preferred to carry out electrolysis at a constant sulfuric acid concentration for a certain period from the initiation of the electrolysis (hereinafter referred to as "former term of electrolysis"), then change the sulfuric acid concentration and carry out electrolysis at a constant sulfuric acid concentration higher than that in the former term of electrolysis during a period after the change of the sulfuric acid concentration until termination of the electrolysis (hereinafter referred to as "latter term of electrolysis"), not to continuously change the sulfuric acid concentration in the electrolyte from the initiation of the electrolysis until termination of the electrolysis.

In a case where the sulfuric acid concentration at the termination of the electrolysis is higher than the sulfuric acid concentration at the initiation of the electrolysis, the sulfuric acid concentration at the initiation of the electrolysis is preferably at least 25 g/L and at most 40 g/L, more preferably higher than 30 g/L and at most 35 g/L. Further, the sulfuric acid concentration at the termination of the electrolysis is preferably at least 32 g/L and at most 55 g/L, more preferably at least 34 g/L and at most 50 g/L, further preferably higher than 40 g/L and at most 45 g/L.

In a case where the sulfuric acid concentration is changed as between the former term of electrolysis and the latter term of electrolysis, it is preferred that the sulfuric acid concentration is the sulfuric acid concentration at the initiation of the electrolysis in the former term of electrolysis and is the sulfuric acid concentration at the termination of the electrolysis in the latter term of electrolysis. Further, the ratio of the electrolysis period during which the electrolysis is carried out at the sulfuric acid concentration in the former term of electrolysis and the electrolysis period during which the electrolysis is carried out at the sulfuric acid concentration in the latter term of electrolysis can optionally be determined. The proportion of the electrolysis period in the former term of electrolysis to the latter term of electrolysis may be 1:9 to 9:1, further 3:7 to 7:3. The period during which the sulfuric acid concentration is changed between the former term of electrolysis and the latter term of electrolysis is preferably sufficiently shorter than the former term of electrolysis and the latter term of electrolysis.

In the production method of the present invention, the electrolysis current density is preferably at least $0.5$ $A/dm^2$ and at most $0.55$ $A/dm^2$. If the electrolysis current density is less than $0.5$ $A/dm^2$ at the concentration of the manganese oxide particles in the solution of sulfuric acid/manganese sulfate mixture of the present invention, the volume of the submesopores effective for the discharge reaction of the electrolytic manganese dioxide tends to be too small, or the alkali potential of the electrolytic manganese dioxide tends to be too low.

On the other hand, if the electrolysis current density at the concentration of the manganese oxide particles in the solution of sulfuric acid/manganese sulfate mixture in the present invention is too high, the BET specific surface area of the electrolytic manganese dioxide tends to be too large, and the volume of the submesopores which contribute to the discharge reaction tends to be too large, or the alkali potential tends to be too low. Accordingly, the electrolysis current density in the production method of the present invention is at most $1.0$ $A/dm^2$. In order to more stably obtain the electrolytic manganese dioxide of the present invention, the electrolysis current density is preferably at most $0.88$ $A/dm^2$, more preferably less than $0.8$ $A/dm^2$, further preferably at most $0.75$ $A/dm^2$. In the present invention, the electrolysis current density means the electrolysis current density at the anode.

The manganese concentration in the electrolyte feed solution of the present invention is not particularly limited, and it may, for example, be at least 40 g/L and at most 60 g/L.

The higher the electrolysis temperature, the higher the efficiency for production of the electrolytic manganese dioxide tends to be. A preferred electrolysis temperature may, for example, be at least 90° C. and at most 98° C. Further, when the electrolysis temperature is higher than 92° C., further at least 95.5° C., electrolytic manganese dioxide having fewer mesopores is likely to be obtained.

The production method of the present invention comprises the above step as an electrolysis step and after this step, may have at least one of a grinding step, a washing step and a neutralizing step.

In the grinding step, the electrolytic manganese dioxide is ground into an optional particle size. The grinding method may be an optional method such as wet grinding or dry grinding.

In the washing step, the electrolytic manganese dioxide obtained by electrolysis is washed to remove the attached electrolyte, etc. Washing may be carried out by immersing the electrolytic manganese dioxide in a water bath or a warm water bath.

In the neutralizing step, the pH of the electrolytic manganese dioxide may be adjusted e.g. by immersing the electrolytic manganese dioxide in an alkali metal aqueous solution such as a sodium hydroxide aqueous solution or an ammonia aqueous solution.

The electrolytic manganese dioxide of the present invention may be used as a cathode active material for primary cells such as manganese cells and alkali-manganese cells.

In a case where the electrolytic manganese dioxide of the present invention is used as a cathode active material for primary cells, the method of its use is not particularly limited. For example, the electrolytic manganese dioxide and an electrically conductive material such as graphite are mixed to prepare a mixed powder, which is formed under an optional pressure into an optional shape to obtain a formed product. Using the formed product as a cathode mixture for primary cells, a dry cell can be constituted.

EXAMPLES

Now, the present invention will be described in further detail with reference to Examples and Comparative Examples. However, it should be understood that the present invention is by no means restricted to such specific Examples.

(Measurement of Potential of Electrolytic Manganese Dioxide)

The potential of electrolytic manganese dioxide was measured in a 40 wt % KOH aqueous solution as follows.

To 3 g of electrolytic manganese dioxide, 0.9 g of carbon was added as an electrically conductive agent to obtain a powder mixture, and 4 ml of a 40 wt % KOH aqueous solution was added to this powder mixture to obtain a mixture slurry comprising the electrolytic manganese dioxide, the carbon and the KOH aqueous solution. The potential of this mixture slurry was measured by using a mercury/mercury oxide reference electrode as a standard to obtain an alkali potential of the electrolytic manganese dioxide.

(Measurement of Pore Volume and Apparent Particle Density of Electrolytic Manganese Dioxide)

The pore volumes of secondary pores, mesopores and submesopores, the apparent particle density and the bulk density were obtained by a mercury intrusion technique (tradename: Poresizer 9510 manufactured by Micrometrics).

As a treatment prior to measurement, the sample was left at rest and dried at 80° C. Then, the range of pressure of mercury was changed step by step from the atmospheric pressure to 414 MPa to carry out measurement. By this measurement, the pore distribution (volume distribution) was obtained, and pores having a pore diameter of at least 2 nm and at most 50 nm were regarded "mesopores", pores having a pore diameter larger than 50 nm and at most 200 nm were regarded as "submesopores", and pores having a pore diameter of at least 2 nm and at most 200 nm were regarded as "secondary pores".

By this measurement, mercury will not be filled in pores having a pore diameter of less than 2 nm even if the pressure of mercury is increased. Accordingly, the pore distribution within a range of the pore diameter of less than 2 nm cannot be measured.

Figure 1:
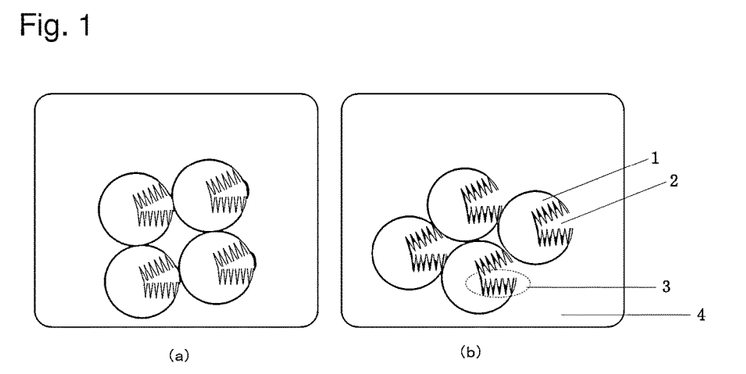
FIG. 1 is a view schematically illustrating the concept of the bulk density and the apparent particle density by a mercury intrusion technique ((a): bulk density, (b): apparent particle density).

The bulk density of the electrolytic manganese dioxide was determined from the amount of mercury when mercury was introduced under atmospheric pressure, and the apparent particle density was obtained from the amount of mercury when mercury was introduced under a pressure up to 410 MPa. FIG. 1 is a view illustrating the concept of the bulk density and the apparent particle density of particulate electrolytic manganese dioxide.

As shown in FIG. 1, when the bulk density is measured, mercury is introduced under atmospheric pressure. Thus, mercury is not filled in pores (having a pore diameter of at least 200 nm) 2 and pores (having a pore diameter of less than 200 nm) 3 in electrolytic manganese dioxide 1. On the other hand, when the apparent particle density is measured, mercury 4 is filled in the pores (having a pore diameter of at least 200 nm) 2 and pores (having a pore diameter of less than 200 nm) 3 by a high pressure. However, under a pressure under which the apparent particle density is measured, mercury 4 is not filled in very fine pores (less than 2 nm) among the pores (having a pore diameter of less than 200 nm) 3 in the electrolytic manganese dioxide 1.

(Measurement of Full Width at Half Maximum (FWHM) in XRD Measurement)

FWHM of the electrolytic manganese dioxide was measured by using a usual X-ray diffraction apparatus (MXP-3 manufactured by MAC Science Co., Ltd.). The measurement was carried out by using CuKα radiation (λ=1.5405 Å) as the radiation source, the measurement mode was step scanning, the scanning condition was 0.04° per second, measuring time was 3 seconds, and the measuring range was within a range of 2θ being from 5° to 80°.

(Calculation of (110)/(021) Peak Intensity Ratio)

In the XRD chart obtained in the same manner as for FWHM, the diffraction line in the vicinity of 2θ=22±1° was taken as a peak corresponding to the (110) plane, and the diffraction line in the vicinity of 20.37±1° was taken as a peak corresponding to the (021) plane. The peak intensity of the (110) plane was divided by the peak intensity of the (021) plane to obtain the (110)/(021) peak intensity ratio.

(Measurement of BET Specific Surface Area)

The BET specific surface area of the electrolytic manganese dioxide was measured by nitrogen adsorption by BET one point method. As a measurement apparatus, a gas adsorption specific surface area measuring apparatus (Flow-Sorb III manufactured by Shimadzu Corporation) was used. Prior to measurement, the measurement sample was subjected to deaeration treatment by heating it at 150° C. for 40 minutes.

(Measurement of Density of Formed Cathode Mixture)

4.29 g of the electrolytic manganese dioxide, 0.365 g of graphite and 0.345 g of a potassium hydroxide aqueous solution containing 40 wt % of potassium hydroxide were mixed to obtain a mixed powder. The mixed powder was formed into a ring under a forming pressure of 2 ton, and the ring was regarded as a cathode mixture. The density of the formed cathode mixture was measured from the mass and the dimensions of the obtained cathode mixture. The density of the formed cathode mixture in each Example is a relative value based on a density of the formed cathode mixture in Comparative Example 1 of 100%.

(Measurement of Middle Rate Discharge Characteristic)

Two pieces of the cathode mixture were prepared in the same method as above. Using the two pieces of the cathode mixture as a cathode and an anode material containing zinc as an anode, an alkali-manganese cell of AA battery was prepared. The prepared alkali manganese cell was left at rest at room temperature for 24 hours, and then the middle rate discharge characteristic was measured.

To measure the middle rate discharge characteristic, the cell was continuously discharged at a discharge current of 250 mA, and the discharge time until the voltage reached a cut-off voltage of 0.9 V was measured. The discharge time of the middle rate discharge in each Example was a relative value based on a discharge time in Comparative Example 1 of 100%.

(Measurement of Manganese Oxide Particles)

0.5 g of electrolytic manganese dioxide was poured into 50 mL of pure water, irradiated with ultrasonic waves for 10 seconds, a predetermined amount of the prepared dispersion slurry was charged into a measurement apparatus (Microtrac HRA manufactured by HONEWELL), and the particle size distribution was measured by a laser diffraction method. From the obtained particle size distribution data, distribution of the particle size and the average particle size of the manganese oxide particles were obtained. For measurement, the refractive index of pure water was 1.33, and the refractive index of manganese dioxide was 2.20.

Example 1

Figure 2:
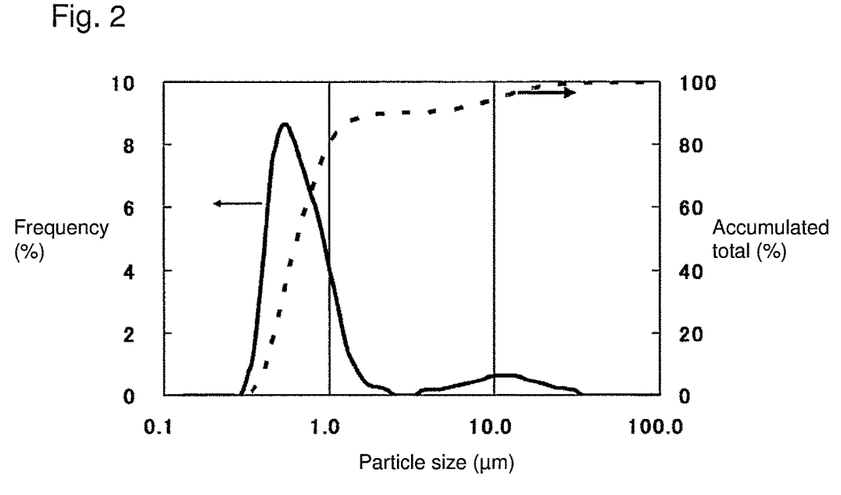
FIG. 2 illustrates a particle size distribution of manganese dioxide particles used in Example 1.

Commercially available electrolytic manganese dioxide (tradename: HH-S manufactured by Tosoh Corporation) was ground by a jet mill to prepare electrolytic manganese dioxide particles having an average particle size (volume average particle size) of 0.63 μm. The obtained electrolytic manganese dioxide particles were regarded as manganese oxide particles. The particle size distribution of the manganese oxide particles is shown in FIG. 2. The manganese oxide particles were dispersed in water at a concentration of 30 g/L to prepare a slurry.

As an electrolyte, a solution of sulfuric acid/manganese sulfate mixture was used. Electrolysis was carried out by continuously adding the slurry into the electrolyte so that the concentration of the manganese oxide particles in the electrolyte would be 8 mg/L and by adding a manganese sulfate feed solution having a manganese ion concentration of 40 g/L to the electrolyte so that the sulfuric acid concentration in the electrolyte would be 34 g/L.

Electrolytic manganese dioxide agglomerate electrodeposited on the anode was separated, washed, ground and neutralized to obtain powdery electrolytic manganese dioxide, which was regarded as the electrolytic manganese dioxide in this Example.

The electrolysis conditions were such that the electrolysis current density was 0.6 A/dm$^2$, the electrolysis temperature was 96° C. and the electrolysis period was 14 days. The electrolysis voltage at the termination of the electrolysis in this Example was 2.65 V.

The production conditions in this Example are shown in Table 1, and the results of evaluation of the obtained electrolytic manganese dioxide are shown in Table 2.

Example 2

Electrolytic manganese dioxide was produced in the same manner as in Example 1 except that the slurry was continuously added to the electrolyte so that the concentration of the manganese oxide particles in the electrolyte would be 5 mg/L, the manganese sulfate feed solution was added to the electrolyte so that the sulfuric acid concentration in the electrolyte would be 33.2 g/L, the electrolysis current density was 0.59 A/dm$^2$, and the electrolysis period was 15 days. The electrolysis voltage at the termination of the electrolysis in this Example was 2.58 V.

The conditions for production of the electrolytic manganese dioxide in this Example are shown in Table 1, and the results of evaluation of the obtained electrolytic manganese dioxide are shown in Table 2.

Example 3

Electrolytic manganese dioxide was produced in the same manner as in Example 1 except that the slurry was continuously added to the electrolyte so that the concentration of the manganese oxide particles in the electrolyte would be 7.7 mg/L, and the manganese sulfate feed solution was added to the electrolyte so that the sulfuric acid concentration in the electrolyte would be 34.3 g/L. The electrolysis voltage at the termination of the electrolysis in this Example was 2.66 V.

The conditions for production of the electrolytic manganese dioxide in this Example are shown in Table 1, and the results of evaluation of the obtained electrolytic manganese dioxide are shown in Table 2.

Example 4

Electrolytic manganese dioxide was produced in the same manner as in Example 1 except that the slurry was continuously added to the electrolyte so that the concentration of the manganese oxide particles in the electrolyte would be 6.9 mg/L, the manganese sulfate feed solution was added to the electrolyte so that the sulfuric acid concentration in the electrolyte would be 32.8 g/L, the electrolysis current density was 0.62 A/dm$^2$, and the electrolysis period was 15 days. The electrolysis voltage at the termination of the electrolysis in this Example was 2.7 V.

The conditions for production of the electrolytic manganese dioxide in this Example are shown in Table 1, and the results of evaluation of the obtained electrolytic manganese dioxide are shown in Table 2.

Example 5

Electrolytic manganese dioxide was produced in the same manner as in Example 1 except that the slurry was continuously added to the electrolyte so that the concentration of the manganese oxide particles in the electrolyte would be 6.9 mg/L, the manganese sulfate feed solution was added to the electrolyte so that the sulfuric acid concentration in the electrolyte in the former term of electrolysis would be 32 g/L and the sulfuric acid concentration in the electrolyte in the latter term of electrolysis would be 35 g/L, the electrolysis current density was 0.62 A/dm$^2$, and the electrolysis period was 10 days in the former term of electrolysis and 5 days in the latter term of electrolysis. The electrolysis voltage at the termination of the electrolysis in this Examples was 2.7 V.

The conditions for production of the electrolytic manganese dioxide in this Example are shown in Table 1, and the results of evaluation of the obtained electrolytic manganese dioxide are shown in Table 2.

Here, the volume of pores having a pore diameter larger than 200 nm of the electrolytic manganese dioxide in this Example was 0.17 cm$^3$/g. In this manner, the volume of pores having a pore diameter larger than 200 nm of the electrolytic manganese dioxide in Example 5 was so small as at most 0.2 cm$^3$/g.

Example 6

Electrolytic manganese dioxide was produced in the same manner as in Example 1 except that the slurry was continuously added to the electrolyte so that the concentration of the manganese oxide particles in the electrolyte would be 6.6 mg/L, the electrolysis current density was 0.62 A/dm$^2$, and the electrolysis period was 12 days. The electrolysis voltage at the termination of the electrolysis in this Example was 2.6 V.

The conditions for production of the electrolytic manganese dioxide in this Example are shown in Table 1, and the results of evaluation of the obtained electrolytic manganese dioxide are shown in Table 2.

Example 7

Electrolytic manganese dioxide was produced in the same manner as in Example 1 except that the slurry was continuously added to the electrolyte so that the concentration of the manganese oxide particles in the electrolyte would be 6.6 mg/L, the manganese sulfate feed solution was added to the electrolyte so that the sulfuric acid concentration in the electrolyte in the former term of electrolysis would be 33 g/L and the sulfuric acid concentration in the electrolyte in the latter term of electrolysis would be 35 g/L, the electrolysis current density was 0.62 A/dm$^2$, and the electrolysis period was 7 days in the former term of electrolysis and 5 days in the latter term of electrolysis. The electrolysis voltage at the termination of the electrolysis in this Examples was 2.6 V.

The conditions for production of the electrolytic manganese dioxide in this Example are shown in Table 1, and the results of evaluation of the obtained electrolytic manganese dioxide are shown in Table 2.

Example 8

Electrolytic manganese dioxide was produced in the same manner as in Example 1 except that the slurry was continuously added to the electrolyte so that the concentration of the manganese oxide particles in the electrolyte would be 24 mg/L, the manganese sulfate feed solution having a manganese ion concentration of 43 g/L was added to the electrolyte so that the sulfuric acid concentration in the electrolyte would be 35 g/L, and the electrolysis current density was 0.75 A/dm$^2$. The electrolysis voltage at the termination of the electrolysis in this Example was 2.2 V.

The conditions for production of the electrolytic manganese dioxide in this Example are shown in Table 1, and the results of evaluation of the obtained electrolytic manganese dioxide are shown in Table 2.

Example 9

Electrolytic manganese dioxide was produced in the same manner as in Example 1 except that the slurry was continuously added to the electrolyte so that the concentration of the manganese oxide particles in the electrolyte would be 18 mg/L, the manganese sulfate feed solution having a manganese ion concentration of 43 g/L was added to the electrolyte so that the sulfuric acid concentration in the electrolyte would be 35 g/L, and the electrolysis current density was 0.86 A/dm$^2$. The electrolysis voltage at the termination of the electrolysis in this Example was 2.31 V.

The conditions for production of the electrolytic manganese dioxide in this Example are shown in Table 1, and the results of evaluation of the obtained electrolytic manganese dioxide are shown in Table 2.

Example 10

Electrolytic manganese dioxide was produced in the same manner as in Example 1 except that the slurry was continuously added to the electrolyte so that the concentration of the manganese oxide particles in the electrolyte would be 6.4 mg/L, the electrolysis current density was 0.61 A/dm², and the electrolysis period was 15 days. The electrolysis voltage at the termination of the electrolysis in this Example was 2.67 V.

The conditions for production of the electrolytic manganese dioxide in this Example are shown in Table 1, and the results of evaluation of the obtained electrolytic manganese dioxide are shown in Table 2.

Example 12

Electrolytic manganese dioxide was produced in the same manner as in Example 1 except that the slurry was continuously added to the electrolyte so that the concentration of the manganese oxide particles in the electrolyte would be 20 mg/L, the manganese sulfate feed solution was added to the electrolyte so that the sulfuric acid concentration in the electrolyte would be 28 g/L, the electrolysis current density

TABLE 1

| | Electrolysis conditions | | | | | | |
|---|---|---|---|---|---|---|---|
| | Manganese ion concentration (g/L) of manganese sulfate feed solution | Sulfuric acid concentration (g/L) in solution of sulfuric acid/manganese sulfate mixture | | Electrolysis | | Manganese oxide particle | Electrolysis voltage (V) at |
| | | Former term of electrolysis | Latter term of electrolysis | current density (A/dm²) | Electrolysis period (days) | concentration (mg/L) | termination of electrolysis |
| Example 1 | 40 | 34 | — | 0.6 | 14 | 8 | 2.65 |
| Example 2 | 40 | 33.2 | — | 0.59 | 15 | 5 | 2.58 |
| Example 3 | 40 | 34.3 | — | 0.6 | 14 | 7.7 | 2.66 |
| Example 4 | 40 | 32.8 | — | 0.62 | 15 | 6.9 | 2.7 |
| Example 5 | 40 | 32 | 35 | 0.62 | 15 | 6.9 | 2.7 |
| Example 6 | 40 | 34 | — | 0.62 | 12 | 6.6 | 2.6 |
| Example 7 | 40 | 33 | 35 | 0.62 | 12 | 6.6 | 2.6 |
| Example 8 | 43 | 35 | — | 0.75 | 14 | 24 | 2.2 |
| Example 9 | 43 | 35 | — | 0.86 | 14 | 18 | 2.31 |
| Example 10 | 40 | 34 | — | 0.61 | 15 | 6.4 | 2.67 |

TABLE 2

| | Electrolytic manganese dioxide | | | | | | | | | | |
|---|---|---|---|---|---|---|---|---|---|---|---|
| | 2-50 nm pore volume (cm³/g) | 50-200 nm pore volume (cm³/g) | 2-200 nm pore volume (cm³/g) | BET specific surface area (m²/g) | Bulk density (g/cm³) | Apparent particle density (g/cm³) | FWHM (deg.) | Alkali potential (mV) | (110)/(021) (—) | Density (%) of formed product | Middle rate discharge characteristic (%) |
| Example 1 | 0.0023 | 0.0339 | 0.0362 | 29.4 | 2.0 | 4.0 | 2.42 | 257 | 0.98 | — | — |
| Example 2 | 0.0003 | 0.0207 | 0.0210 | 29.1 | 1.6 | 3.5 | 2.39 | 279 | 0.73 | 106 | 110 |
| Example 3 | 0.0028 | 0.0399 | 0.0427 | 22.4 | 2.0 | 4.1 | 1.91 | 270 | 1.01 | — | — |
| Example 4 | 0.0021 | 0.0087 | 0.0108 | 28.9 | 2.2 | 3.9 | 2.28 | 278 | 0.81 | — | — |
| Example 5 | 0.0020 | 0.0077 | 0.0097 | 30.1 | 2.1 | 3.5 | 2.36 | 285 | 0.77 | 104 | 108 |
| Example 6 | 0.0018 | 0.0096 | 0.0114 | 32.1 | 2.2 | 3.9 | 2.45 | 280 | 0.61 | — | — |
| Example 7 | 0.0022 | 0.0145 | 0.0167 | 33.9 | 1.8 | 3.6 | 2.42 | 290 | 0.66 | 102 | 107 |
| Example 8 | 0.0017 | 0.0134 | 0.0151 | 14.1 | 2.3 | 4.0 | 1.62 | 276 | 0.96 | — | — |
| Example 9 | 0.0010 | 0.0116 | 0.0126 | 16.9 | 2.3 | 4.1 | 1.91 | 281 | 0.91 | — | — |
| Example 10 | 0.0035 | 0.0120 | 0.0155 | 25.3 | 2.2 | 3.9 | 2.18 | 285 | 0.87 | 105 | 104 |

Example 11

Electrolytic manganese dioxide was produced in the same manner as in Example 1 except that the slurry was continuously added to the electrolyte so that the concentration of the manganese oxide particles in the electrolyte would be 20 mg/L, the manganese sulfate feed solution was added to the electrolyte so that the sulfuric acid concentration in the electrolyte would be 42 g/L, the electrolysis current density was 0.88 A/dm², and the electrolysis period was 1 day. The electrolysis voltage at the termination of the electrolysis in this Example was 1.98 V.

The conditions for production of the electrolytic manganese dioxide in this Example are shown in Table 3, and the results of evaluation of the obtained electrolytic manganese dioxide are shown in Table 4.

was 0.88 A/dm², and the electrolysis period was 1 day. The electrolysis voltage at the termination of the electrolysis in this Example was 1.95 V.

The conditions for production of the electrolytic manganese dioxide in this Example are shown in Table 3, and the results of evaluation of the obtained electrolytic manganese dioxide are shown in Table 4.

Example 13

Electrolytic manganese dioxide was produced in the same manner as in Example 1 except that the slurry was continuously added to the electrolyte so that the concentration of the manganese oxide particles in the electrolyte would be 20 mg/L, the manganese sulfate feed solution was added to the electrolyte so that the sulfuric acid concentration in the electrolyte in the former term of electrolysis would be 25 g/L and the sulfuric acid concentration in the electrolyte in the latter term of electrolysis would be 40 g/L, the electrolysis current density was 0.88 A/dm$^2$, and the electrolysis period was 1 day in the former term of electrolysis and 2 days in the latter term of electrolysis. The electrolysis voltage at the termination of the electrolysis in this Examples was 1.90 V.

The conditions for production of the electrolytic manganese dioxide in this Example are shown in Table 3, and the results of evaluation of the obtained electrolytic manganese dioxide are shown in Table 4.

Example 14

Electrolytic manganese dioxide was produced in the same manner as in Example 1 except that the slurry was continuously added to the electrolyte so that the concentration of the manganese oxide particles in the electrolyte would be 20 mg/L, the manganese sulfate feed solution was added to the electrolyte so that the sulfuric acid concentration in the electrolyte in the former term of electrolysis would be 30 g/L and the sulfuric acid concentration in the electrolyte in the latter term of electrolysis would be 45 g/L, the electrolysis current density was 0.5 A/dm$^2$, and the electrolysis period was 1 day in the former term of electrolysis and 2 days in the latter term of electrolysis. The electrolysis voltage at the termination of the electrolysis in this Examples was 1.71 V.

The conditions for production of the electrolytic manganese dioxide in this Example are shown in Table 3, and the results of evaluation of the obtained electrolytic manganese dioxide are shown in Table 4.

Example 15

Electrolytic manganese dioxide was produced in the same manner as in Example 1 except that the slurry was continuously added to the electrolyte so that the concentration of the manganese oxide particles in the electrolyte would be 20 mg/L, the manganese sulfate feed solution was added to the electrolyte so that the sulfuric acid concentration in the electrolyte in the former term of electrolysis would be 30 g/L and the sulfuric acid concentration in the electrolyte in the latter term of electrolysis would be 45 g/L, the electrolysis current density was 1.0 A/dm$^2$, and the electrolysis period was 1 day in the former term of electrolysis and 2 days in the latter term of electrolysis. The electrolysis voltage at the termination of the electrolysis in this Examples was 1.98 V.

The conditions for production of the electrolytic manganese dioxide in this Example are shown in Table 3, and the results of evaluation of the obtained electrolytic manganese dioxide are shown in Table 4.

Example 16

Electrolytic manganese dioxide was produced in the same manner as in Example 1 except that the slurry was continuously added to the electrolyte so that the concentration of the manganese oxide particles in the electrolyte would be 50 mg/L, the manganese sulfate feed solution was added to the electrolyte so that the sulfuric acid concentration in the electrolyte in the former term of electrolysis would be 30 g/L and the sulfuric acid concentration in the electrolyte in the latter term of electrolysis would be 45 g/L, the electrolysis current density was 0.88 A/dm$^2$, and the electrolysis period was 1 day in the former term of electrolysis and 2 days in the latter term of electrolysis. The electrolysis voltage at the termination of the electrolysis in this Examples was 1.91 V.

The conditions for production of the electrolytic manganese dioxide in this Example are shown in Table 3, and the results of evaluation of the obtained electrolytic manganese dioxide are shown in Table 4.

TABLE 3

| | Electrolysis conditions | | | | | | |
|---|---|---|---|---|---|---|---|
| | Manganese ion concentration (g/L) of manganese sulfate feed solution | Sulfuric acid concentration (g/L) in solution of sulfuric acid/manganese sulfate mixture | | Electrolysis current density (A/dm$^2$) | Total electrolysis period (days) | Electrolysis after switch (days) | Manganese oxide particle concentration (mg/L) | Electrolysis voltage (V) at termination of electrolysis |
| | | Former term of electrolysis | Latter term of electrolysis | | | | | |
| Example 11 | 40 | 42 | — | 0.88 | 1 | — | 20 | 1.98 |
| Example 12 | 40 | 28 | — | 0.88 | 1 | — | 20 | 1.95 |
| Example 13 | 40 | 25 | 40 | 0.88 | 3 | 1 | 20 | 1.90 |
| Example 14 | 40 | 30 | 45 | 0.5 | 3 | 1 | 20 | 1.71 |
| Example 15 | 40 | 30 | 45 | 1.0 | 3 | 1 | 20 | 1.98 |
| Example 16 | 40 | 30 | 45 | 0.88 | 3 | 1 | 50 | 1.91 |

TABLE 4

| | Electrolytic manganese dioxide | | | | | | | | |
|---|---|---|---|---|---|---|---|---|---|
| | 2-50 nm pore volume (cm$^3$/g) | 50-200 nm pore volume (cm$^3$/g) | 2-200 nm pore volume (cm$^3$/g) | BET specific surface area (m$^2$/g) | Bulk density (g/cm$^3$) | Apparent particle density (g/cm$^3$) | FWHM (deg.) | Alkali potential (mV) | (110)/(021) (—) |
| Example 11 | 0.0000 | 0.005 | 0.0050 | 12.1 | 2.3 | 3.9 | 1.91 | 282 | 0.85 |
| Example 12 | 0.0003 | 0.004 | 0.0043 | 17.1 | 2.2 | 3.6 | 2.55 | 257 | 0.68 |

TABLE 4-continued

| | Electrolytic manganese dioxide | | | | | | | | | |
|---|---|---|---|---|---|---|---|---|---|---|
| | 2-50 nm pore volume (cm³/g) | 50-200 nm pore volume (cm³/g) | 2-200 nm pore volume (cm³/g) | BET specific surface area (m²/g) | Bulk density (g/cm³) | Apparent particle density (g/cm³) | FWHM (deg.) | Alkali potential (mV) | (110)/(021) (—) |
| Example 13 | 0.0000 | 0.004 | 0.0040 | 12.6 | 2.3 | 3.9 | 1.90 | 268 | 1.01 |
| Example 14 | 0.0000 | 0.005 | 0.0050 | 14.7 | 2.2 | 3.9 | 1.77 | 279 | 0.87 |
| Example 15 | 0.0002 | 0.005 | 0.0052 | 19.9 | 2.2 | 3.7 | 1.88 | 293 | 0.93 |
| Example 16 | 0.0000 | 0.005 | 0.0050 | 12.8 | 2.4 | 4.0 | 1.60 | 272 | 1.10 |

Comparative Example 1

Electrolysis was carried out using a solution of sulfuric acid/manganese sulfate mixture as an electrolyte and by adding a manganese sulfate feed solution having a manganese ion concentration of 40 g/L to the electrolyte so that the sulfuric acid concentration in the electrolyte would be 34 g/L. The concentration of manganese oxide particles in the solution of sulfuric acid/manganese sulfate mixture during the electrolysis was 2.1 mg/L.

Electrolytic manganese dioxide agglomerate electrodeposited on the anode was separated, washed, ground and neutralized to obtain powdery electrolytic manganese dioxide, which was regarded as electrolytic manganese dioxide in this Comparative Example.

The electrolysis conditions were such that the electrolysis current density was 0.6 A/dm², the electrolysis temperature was 96° C. and the electrolysis period was 15 days. The electrolysis voltage at the termination of the electrolysis in this Comparative Example was 3.2 V.

The conditions for production of the electrolytic manganese dioxide in this Comparative Example are shown in Table 5, and the results of evaluation of the obtained electrolytic manganese dioxide are shown in Table 6.

Of the electrolytic manganese dioxide in this Comparative Example, the volume of the mesopores was larger than that of the electrolytic manganese dioxide of the present invention. Further, FWHM of the electrolytic manganese dioxide in this Comparative Example was so large as 2.95°. Thus, it was found that the electrolytic manganese dioxide obtained by an electrolysis method at a low concentration of manganese oxide particles is different from the electrolytic manganese dioxide of the present invention not only in the pore structure but also in the crystallinity.

Further, of the electrolytic manganese dioxide in this Comparative Example, the middle rate discharge characteristic was lower than that of the electrolytic manganese dioxide of the present invention although its alkali potential was the same level as the electrolytic manganese dioxide of the present invention.

Comparative Example 2

Electrolytic manganese dioxide was produced in the same manner as in Comparative Example 1 except that the manganese sulfate feed solution was added to the electrolyte so that the sulfuric acid concentration in the electrolyte would be 25 g/L, the electrolysis current density was 0.2 A/dm², and the electrolysis period was 30 days. The electrolysis voltage at the termination of the electrolysis in this Comparative Example was 2.3 V.

The conditions for production of the electrolytic manganese dioxide in this Comparative Example are shown in Table 5, and the results of evaluation of the obtained electrolytic manganese dioxide are shown in Table 6.

It was found that of the electrolytic manganese dioxide in this Comparative Example, the volume of the mesopores is larger than that of the electrolytic manganese dioxide of the present invention, and the alkali potential is lower than that of the electrolytic manganese dioxide of the present invention.

Further, the (110)/(021) peak intensity ratio in this Comparative Example was 1.75, and it was confirmed that of the electrolytic manganese dioxide obtained under conditions of a low electrolysis current density, not only the volume of the mesopores and the alkali potential but also the crystallinity are different from those of the electrolytic manganese dioxide in Example.

Comparative Example 3

Electrolytic manganese dioxide was produced in the same manner as in Example 1 except that the slurry was continuously added to the electrolyte so that the concentration of the manganese oxide particles in the electrolyte would be 30 mg/L, the manganese sulfate feed solution was added to the electrolyte so that the sulfuric acid concentration in the electrolyte would be 25 g/L, the electrolysis current density was 1.5 A/dm², and the electrolysis period was 4 days. The electrolysis voltage at the termination of the electrolysis in this Comparative Example was 3.48 V.

The conditions for production of the electrolytic manganese dioxide in this Comparative Example are shown in Table 5, and the results of evaluation of the obtained electrolytic manganese dioxide are shown in Table 6.

Of the electrolytic manganese dioxide in this Comparative Example, the volume of the mesopores was larger than that of the electrolytic manganese dioxide of the present invention, and the alkali potential was lower. Accordingly, it was found that the electrolytic manganese dioxide obtainable under electrolysis conditions with a high electrolysis current density has neither of the volume of the mesopores and the alkali potential of the electrolytic manganese dioxide of the present invention.

TABLE 5

| | Electrolysis conditions | | | | | |
|---|---|---|---|---|---|---|
| | Manganese ion concentration (g/L) of manganese sulfate feed solution | Sulfuric acid concentration (g/L) in solution of sulfuric acid/manganese sulfate mixture | Electrolysis current density (A/dm$^2$) | Electrolysis period (days) | Manganese oxide particle concentration (mg/L) | Electrolysis voltage (V) at termination of electrolysis |
| Comparative Example 1 | 40 | 34 | 0.6 | 15 | 2.1 | 2.8 |
| Comparative Example 2 | 40 | 25 | 0.2 | 30 | — | 2.3 |
| Comparative Example 3 | 40 | 25 | 1.5 | 4 | 30 | 3.48 |

TABLE 6

| | Electrolytic manganese dioxide | | | | | | | | | | |
|---|---|---|---|---|---|---|---|---|---|---|---|
| | 2-50 nm pore volume (cm$^3$/g) | 50-200 nm pore volume (cm$^3$/g) | 2-200 nm pore volume (cm$^3$/g) | BET specific surface area (m$^2$/g) | Bulk density (g/cm$^3$) | Apparent particle density (g/cm$^3$) | FWHM (deg.) | Alkali potential (mV) | (110)/(021) (—) | Density (%) of formed product | Middle rate discharge characteristic (%) |
| Comparative Example 1 | 0.0059 | 0.0096 | 0.0155 | 38 | 1.9 | 3.5 | 2.95 | 275 | 0.56 | 100 | 100 |
| Comparative Example 2 | 0.0087 | 0.0098 | 0.0185 | 38 | 1.7 | 3.2 | 1.75 | 238 | 1.08 | — | — |
| Comparative Example 3 | 0.0264 | 0.0145 | 0.0409 | 48 | 1.7 | 3.5 | 3.46 | 235 | 0.58 | — | — |

As evident from these results, of the electrolytic manganese dioxide in each Example, the density of the formed product was higher than that of the electrolytic manganese dioxide in each Comparative Example. Particularly with respect to the electrolytic manganese dioxide in Example 2, although its bulk density is lower than that of the electrolytic manganese dioxide in Comparative Example 1, the density of the formed cathode mixture using it and the middle rate discharge characteristic are higher than those of the electrolytic manganese dioxide in Comparative Example 1.

From these results, it was found that the electrolytic manganese dioxide of the present invention is excellent in the middle rate discharge characteristic by having both of the volume of the mesopores and the alkali potential.

Comparative Example 4

Electrolytic manganese dioxide was produced in the same manner as in Example 1 except that the slurry was continuously added to the electrolyte so that the concentration of the manganese oxide particles in the electrolyte would be 20 mg/L, the manganese sulfate feed solution was added to the electrolyte so that the sulfuric acid concentration in the electrolyte would be 56 g/L, the electrolysis current density was 0.88 A/dm$^2$, and the electrolysis period was 1 day. The electrolysis voltage at the termination of the electrolysis in this Comparative Example was 2.06 V.

The conditions for production of the electrolytic manganese dioxide in this Comparative Example are shown in Table 7, and the results of evaluation of the obtained electrolytic manganese dioxide are shown in Table 8.

By electrolysis in this Comparative Example, a phenomenon such that deposited electrolytic manganese dioxide was peeled from the electrode, so-called peeling frequently occurred during the period of the electrolysis, and the yield of the electrolytic manganese dioxide was very low. Further, the alkali potential of the obtained electrolytic manganese dioxide was low. Thus, it was confirmed that by electrolysis with a high acid concentration in the electrolyte, not only electrolytic manganese dioxide is hardly obtained but also the electrolytic manganese dioxide of the present invention is not obtained.

Comparative Example 5

Electrolytic manganese dioxide was produced in the same manner as in Example 1 except that the slurry was continuously added to the electrolyte so that the concentration of the manganese oxide particles in the electrolyte would be 20 mg/L, the manganese sulfate feed solution was added to the electrolyte so that the sulfuric acid concentration in the electrolyte in the former term of electrolysis would be 30 g/L and the sulfuric acid concentration in the electrolyte in the latter term of electrolysis would be 45 g/L, the electrolysis current density was 1.1 A/dm$^2$, and the electrolysis period was 1 day in the former term of electrolysis and 2 days in the latter term of electrolysis. The electrolysis voltage at the termination of the electrolysis in this Comparative Example was 3.14 V.

The conditions for production of the electrolytic manganese dioxide in this Comparative Example are shown in Table 7, and the results of evaluation of the obtained electrolytic manganese dioxide are shown in Table 8.

By electrolysis in this Comparative Example, a phenomenon such that the deposited electrolytic manganese dioxide was peeled from the electrode, so-called peeling occurred during the period of the electrolysis. Further, the obtained electrolytic manganese dioxide was such that the volume of the mesopores tended to be slightly larger and the alkali potential was low.

Comparative Example 6

Electrolytic manganese dioxide was produced in the same manner as in Example 1 except that the slurry was continuously added to the electrolyte so that the concentration of the manganese oxide particles in the electrolyte would be 20 mg/L, the manganese sulfate feed solution was added to the electrolyte so that the sulfuric acid concentration in the electrolyte in the former term of electrolysis would be 30 g/L and the sulfuric acid concentration in the electrolyte in the latter term of electrolysis would be 45 g/L, the electrolysis current density was 0.4 A/dm$^2$, and the electrolysis period was 1 day in the former term of electrolysis and 2 days in the latter term of electrolysis. The electrolysis voltage at the termination of the electrolysis in this Comparative Example was 1.68 V.

The conditions for production of the electrolytic manganese dioxide in this Comparative Example are shown in Table 7, and the results of evaluation of the obtained electrolytic manganese dioxide are shown in Table 8.

Of the electrolytic manganese dioxide in this Comparative Example, the volume of the mesopores was small, but the alkali potential was low.

Comparative Example 7

Electrolytic manganese dioxide was produced in the same manner as in Example 1 except that the slurry was continuously added to the electrolyte so that the concentration of the manganese oxide particles in the electrolyte would be 60 mg/L, the manganese sulfate feed solution was added to the electrolyte so that the sulfuric acid concentration in the electrolyte in the former term of electrolysis would be 30 g/L and the sulfuric acid concentration in the electrolyte in the latter term of electrolysis would be 45 g/L, the electrolysis current density was 0.88 A/dm$^2$, and the electrolysis period was 1 day in the former term of electrolysis and 2 days in the latter term of electrolysis. The electrolysis voltage at the termination of the electrolysis in this Comparative Example was 1.86 V.

The conditions for production of the electrolytic manganese dioxide in this Comparative Example are shown in Table 7, and the results of evaluation of the obtained electrolytic manganese dioxide are shown in Table 8.

Of the electrolytic manganese dioxide in this Comparative Example, the volume of the mesopores was small, but the alkali potential was low.

TABLE 7

| | | Electrolysis conditions | | | | | | |
|---|---|---|---|---|---|---|---|---|
| | Manganese ion concentration (g/L) of manganese sulfate feed solution | Sulfuric acid concentration (g/L) in solution of sulfuric acid/manganese sulfate mixture | | Electrolysis current density (A/dm$^2$) | Total electrolysis period (days) | Electrolysis after switch (days) | Manganese oxide particle concentration (mg/L) | Electrolysis voltage (V) at termination of electrolysis |
| | | Former term of electrolysis | Latter term of electrolysis | | | | | |
| Comparative Example 4 | 40 | 56 | — | 0.88 | 1 | — | 20 | 2.06 |
| Comparative Example 5 | 40 | 30 | 45 | 1.1 | 3 | 1 | 20 | 3.14 |
| Comparative Example 6 | 40 | 30 | 45 | 0.4 | 3 | 1 | 20 | 1.68 |
| Comparative Example 7 | 40 | 30 | 45 | 0.88 | 3 | 1 | 60 | 1.86 |

TABLE 8

| | Electrolytic manganese dioxide | | | | | | | | |
|---|---|---|---|---|---|---|---|---|---|
| | 2-50 nm pore volume (cm$^3$/g) | 50-200 nm pore volume (cm$^3$/g) | 2-200 nm pore volume (cm$^3$/g) | BET specific surface area (m$^2$/g) | Bulk density (g/cm$^3$) | Apparent particle density (g/cm$^3$) | FWHM (deg.) | Alkali potential (mV) | (110)/(021) (—) |
| Comparative Example 4 | 0.0004 | 0.006 | 0.0064 | 15.3 | 2.3 | 3.7 | 2.49 | 240 | 0.64 |
| Comparative Example 5 | 0.0029 | 0.006 | 0.0089 | 31.4 | 2.1 | 3.6 | 3.20 | 216 | 0.49 |
| Comparative Example 6 | 0.0000 | 0.004 | 0.0040 | 15.0 | 2.2 | 3.8 | 1.71 | 245 | 0.97 |
| Comparative Example 7 | 0.0000 | 0.005 | 0.0050 | 8.9 | 2.2 | 3.8 | 1.62 | 232 | 1.11 |

INDUSTRIAL APPLICABILITY

The electrolytic manganese dioxide of the present invention is suitably used as a cathode active material for primary cells such as manganese dry cells and alkali-manganese dry cells.

The entire disclosure of Japanese Patent Application No. 2012-034980 filed on Feb. 21, 2012 including specification, claims, drawings and summary is incorporated herein by reference in its entirety.

REFERENCE SYMBOLS

1: Electrolytic manganese dioxide
2: Pore (having a pore diameter larger than 200 nm)
3: Pore (having a pore diameter of at most 200 nm)
4: Mercury (Hg)

The invention claimed is:

1. Electrolytic manganese dioxide characterized in that the potential as measured in a 40 wt % KOH aqueous solution by using a mercury/mercury oxide reference electrode as a standard is higher than 250 mV and less than 310 mV, and the volume of pores having a pore diameter of at least 2 nm and at most 50 nm is at most 0.0055 cm$^3$/g, and wherein the BET specific surface area is at least 12 m$^2$/g and less than 36 m$^2$/g, the apparent particle density is at least 3.4 g/cm$^3$, and the full width at half maximum of the diffraction line of the (110) plane in the vicinity of $2\theta=22\pm1°$ in a XRD measurement pattern using CuK$\alpha$ radiation as the light source is at least 1.6° and at most 2.6°.

2. The electrolytic manganese dioxide according to claim 1, wherein the volume of pores having a pore diameter of at least 2 nm and at most 200 nm is at most 0.0555 cm$^3$/g.

3. The electrolytic manganese dioxide according to claim 1, wherein the bulk density is at least 1.5 g/cm$^3$.

4. A method for producing the electrolytic manganese dioxide as defined in claim 1, by suspending manganese oxide in a solution of sulfuric acid/manganese sulfate mixture, characterized in that manganese oxide particles are continuously mixed with the solution of sulfuric acid/manganese sulfate mixture, and electrolysis is carried out at a concentration of the manganese oxide particles in the solution of sulfuric acid/manganese sulfate mixture of at least 2.5 mg/L and at most 50 mg/L, at a sulfuric acid concentration in the solution of sulfuric acid/manganese sulfate mixture of at least 25 g/L and at most 55 g/L, at an electrolysis current density of at least 0.5 A/dm$^2$ and at most 1.0 A/dm$^2$.

5. The method for producing the electrolytic manganese dioxide according to claim 4, wherein the electrolysis current density is at least 0.55 A/dm$^2$ and at most 0.88 A/dm$^2$.

6. The method for producing the electrolytic manganese dioxide according to claim 4, wherein the concentration of the manganese oxide particles is higher than 3 mg/L and at most 30 mg/L.

7. The method for producing the electrolytic manganese dioxide according to claim 4, wherein the sulfuric acid concentration at the termination of the electrolysis is higher than the sulfuric acid concentration at the initiation of the electrolysis.

8. A cathode active material containing the electrolytic manganese dioxide as defined in claim 1.

* * * * *